G. Owen.
Cultivator.
No. 1,598. Reissued Jan. 5, 1864.
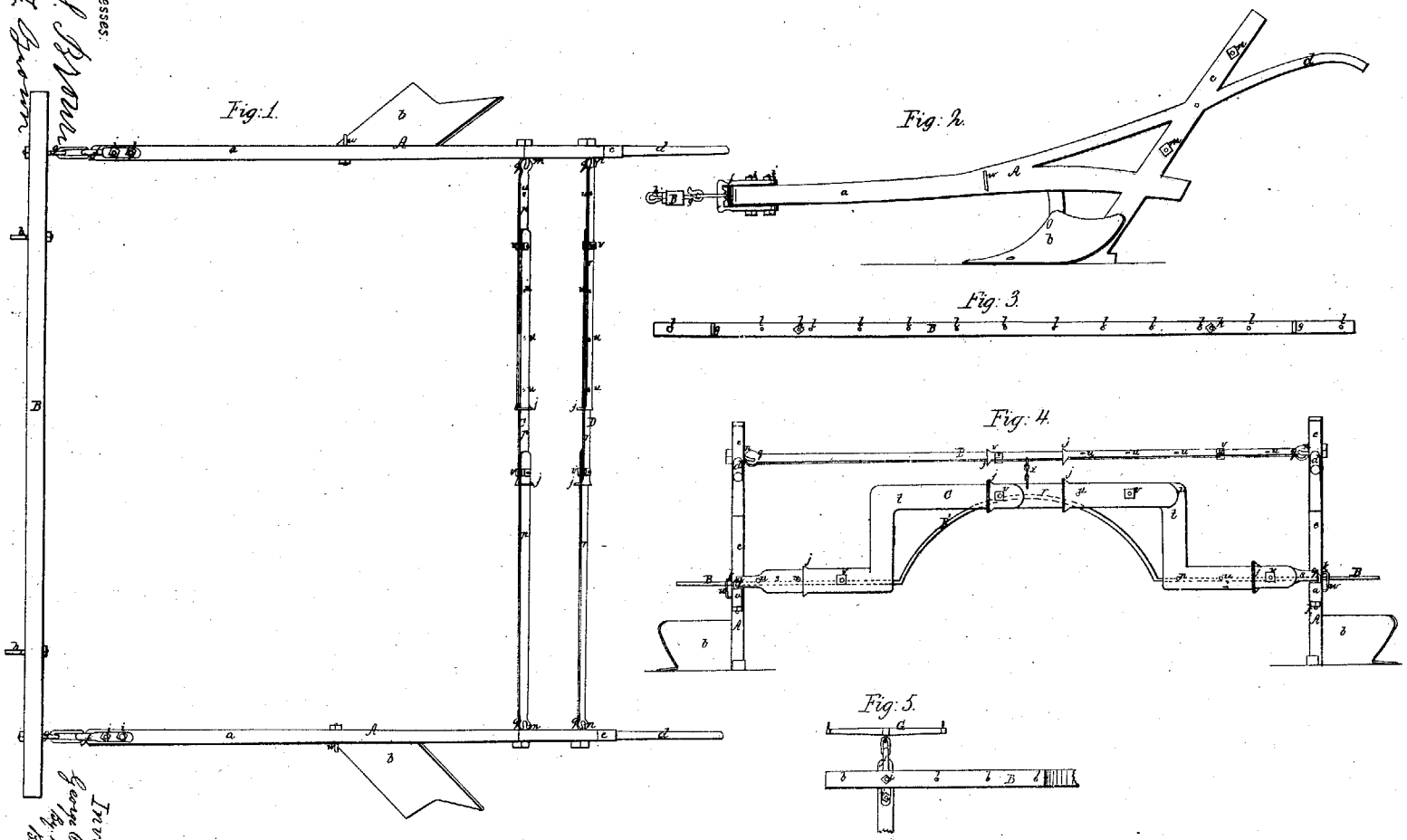
Witnesses.
J. S. Brown
Geo. F. Brown
Inventor.
George Owen
By his Atty.
Benj. C. Owen
N. PETERS, PHOTO-LITHOGRAPHER, WASHINGTON, D. C.

UNITED STATES PATENT OFFICE.

GEORGE OWEN, OF JACKSONVILLE, ILLINOIS.

IMPROVEMENT IN PLOW-COUPLINGS.

Specification forming part of Letters Patent No. 34,316, dated February 4, 1862; Reissue No. 1,598, dated January 5, 1864.

*To all whom it may concern:*

Be it known that I, GEORGE OWEN, of Jacksonville, in the county of Morgan and State of Illinois, have invented a new and Improved Coupling for Double Plows for the Purpose of Planting and Cultivating; and I do hereby declare that the following is a full and exact description thereof, reference being had to the accompanying drawings, making part of this specification.

Figure 1 is a plan of two plows connected by my improved coupling; Fig. 2, a side elevation thereof; Fig. 3, a rear view of a part detached; Fig. 4, a rear view of the whole, showing curved or bent coupling-bars to suit the purpose of cultivating over-high corn or other growing crop; Fig. 5, a plan of a part detached.

Like letters designate corresponding parts in all of the figures.

The object of my invention is to connect two plows for planting two rows at once, or for cultivating between two rows of corn or other crop at the same time in such a manner that the plows may be as readily managed and controlled as one plow, that each plow at the same time may have all the freedom of motion desirable independent of the other, that they may be both adapted to the variable motions and positions of the team without disarrangement, and that the distances between the two plows may be varied by adjustment at pleasure.

In order to effect these results, I employ two coupling-bars, C D, having the following qualities and effects: rigidity, so as to keep the plows A A properly separated; adjustability in length from the shortest to the longest practicable and desirable extent, so as to adapt the distance of the plows to all desirable purposes and conditions; being freely jointed to the plows, and in other respects arranged so that all the necessary freedom of motion may be allowed to one plow independent of the other, and yet connecting the plows in such positions that one plow will keep the other in proper control, whereby both may be readily managed by one attendant.

To give the coupling-bars C D the two first-named qualities in a proper and practicable manner they are respectively of a greater or less number of separate parts, *p p p* and *r r r*, one lapping by another, substantially as represented in the drawings, there being none of them short enough to bring the plows as close together as ever desired by using two of them, and sufficient of them in number to separate the plows as widely as ever required by employing three or more of them. These parts are joined rigidly together by providing one end of one with an eye or loop, *j*, through a nearly right-angled projection thereof, just large enough to receive the tongue end of the adjacent part, substantially as shown, and having the plates thus lapped perforated with holes *u u* at uniform distances apart, through which screw-bolts *v v* are inserted, and thus confine the parts rigidly together. By changing the bolts to different holes the length of the coupling-bar is readily varied at pleasure, and whenever the change in length is too great to be effected by simple adjustment in this way one or more of the parts of which the bar is composed are removed or inserted, as required.

The extremities of the coupling-bars, constructed as above described, are formed into eyes or rings *q q*, which are respectively linked into the eyes of eyebolts *m m* and *n n*. These eyebolts are passed through holes in the standards *c c* of the plows and secured there by nuts, so that the plows are thus freely jointed to the coupling-bars, and since the coupling-bars are placed parallel with each other, the plows also being in parallel positions, the joint motions of the plows may be freely made, either vertically or horizontally, as much as desired. Thus, for example, one plow may be freely raised or lowered without disturbing the other plow; or one plow may advance beyond the other, as one horse may go a little ahead of his mate without restraint or injury to the working of the plows; but, on the other hand, in order that one plow may be sufficiently controlled by the other, so that one attendant may easily manage both, one coupling-bar, C, is considerably lower down than the other coupling-bar, D, so that when one plow is held upright the other must remain upright also, and one coupling bar is considerably farther forward than the other, so that, however much one plow may advance before the other, they must remain parallel, and if one is straightforward the other also must be straightforward.

With this coupling of the two plows only one handle, *d*, is required for each, the attendant holding the single handle of each plow, respectively, in each hand; but since the plows A A may be used separately for other purposes, each may be provided with a connecting-bolt, *w*, or its equivalent, for attaching a second handle to the plow in the usual manner.

The mold-boards *b b* of the two plows turn in opposite directions—say both outward—so that when running between different rows of corn; the soil may be turned up against or away from all the rows alike; or, if the plows are near together, by the same arrangement they may turn the soil from both sides of the row between them; or the mold-boards may both turn inward toward each other; or they may both turn in the same direction, if desired, for a special purpose, and they may be so adjusted as to cultivate midway between the rows or otherwise.

By using very short coupling-bar parts or pieces *s s*, as seen at the ends of the lower coupling-bar, C, in Fig. 4, and jointing them to the rear ends of the plow-beams *a a*, as there shown, the plows may be brought close together and used as one plow—useful for digging potatoes, for instance. In this case the forward ends of the plow-beams *a a* are generally coupled by simply hooking the draft-hook into the clevises of both.

In order that the front ends of the plow-beams *a a* may be kept at the proper distances apart, so as not to bring strain on the coupling-bars, a rigid draft-bar, B, is employed. This is provided with sets of holes *l l*, Fig. 3, at uniform distances apart, corresponding with the distances between the holes *u u* of the coupling-bars C D, and into two of these holes hooks or ring-bolts *g g* are inserted, for the purpose of connecting the draft-bar with the clevises *f f* on the plow-beams, the holes *l l* used being the proper ones to keep the plow-beams at the desired distance apart. Other hooks or staples, *h h*, are secured to the draft-bar to hitch the whiffletrees to for drawing the plows. This draft-bar B may also be constructed in parts adjustable upon each other in the same manner as the coupling-bars C D, and for the same purpose. The only practical difficulty in the way is in making it sufficiently rigid and strong at the same time to serve as a draft-bar. By using it simply as a coupling-bar there is no difficulty in the way, and I contemplate such a modification of the plan.

When the corn or other crop is high, so that the lower coupling-bar, C, and the front draft or coupling bar, B, would be liable to strike and injure it, the following construction is adopted: Two of the middle division parts, *t t*, Fig. 4, of the coupling-bar C are curved or bent upward, substantially as represented, so as to carry the portion which is to pass over the corn high enough to prevent injury to the same. It will be seen that the same mode of uniting and adjusting the parts of this curved or bent coupling-bar is employed as with the straight coupling-bar; but for the sake of convenience it may be desirable to hinge the ends of this curved or bent coupling-bar to the rear ends of the plow-beams *a a*, as shown in Fig. 4, instead of jointing them to the standards *c c*; but this is not essential. A single middle part only may be curved or bent; but in that case it is required to be too long for every capability of the coupling; or more than two parts may combine to form the curve.

In order that the raised or curved portion of the coupling-bar may be kept securely upright, it is usually suspended from the upper coupling-bar, D, by means of a connecting chain, cord, or its equivalent, as at *x*, Fig. 4.

Since the draft-bar B cannot with convenience be used with high corn, instead of it a stretcher-bar, B′, Fig. 4, is employed, to be curved or bent upward in the middle and provided with sets of holes *l l* at the proper intervals, so that it may be placed across the forward ends of the plow-beams *a a* and held in place by one of the clevis-bolts *i i* at each end, as shown in Fig. 5. In this case the whiffletrees G G are hitched directly to the clevises *f f*, as indicated in the same figure. It is obvious that this stretcher or coupling-bar may also have adjustable parts composing a compound-coupling-bar in the same manner and for the same purposes as the regular coupling-bars C D.

It is obvious that three or more plows may be coupled together in the same manner as the two, as above described. The material for the coupling-bars may be either iron or wood.

What I claim as my invention, and desire to secure by Letters Patent, is—

1. Connecting two single plows by means of the hinged coupling pieces or rods *s s*, attached to the beams of said plows in the rear of the standards thereof, so as to bring the plows close together and thereby form a double mold-board plow, substantially in the manner and for the purpose described.

2. The combination of the curved or bent piece or pieces *t t* and the sliding joints of the bars C and D, in the manner and for the purpose herein specified.

3. Connecting the compound curved or bent coupling bar C with the upper coupling-bar, D, substantially in the manner and for the purpose herein set forth.

4. The combination of the front curved or bent stretcher-bar, B′, and curved or bent coupling-bar C for connecting two plows, substantially in the manner and for the purpose herein set forth.

The above specification signed by me this 13th day of March, 1862.

GEO. OWEN.

Witnesses:
CHAS. H. McELROY,
BENJ. J. OWEN.